US006557032B1

(12) United States Patent
Jones et al.

(10) Patent No.: US 6,557,032 B1
(45) Date of Patent: Apr. 29, 2003

(54) DATA PROCESSING SYSTEM USING ACTIVE TOKENS AND METHOD FOR CONTROLLING SUCH A SYSTEM

(75) Inventors: Julian Hamilton Jones, Romsey (GB); Howard Shelton Lambert, Southampton (GB); James Ronald Lewis Orchard, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/093,019

(22) Filed: Jun. 5, 1998

(30) Foreign Application Priority Data

Jun. 7, 1997 (GB) .............................................. 9711716

(51) Int. Cl.[7] .............................................. G06F 15/16
(52) U.S. Cl. .......................... 709/220; 705/21; 235/380
(58) Field of Search ................................ 709/201, 251, 709/225, 227, 220, 221, 222; 713/200, 172, 201; 705/44, 16, 17, 21; 235/375, 380, 435

(56) References Cited

U.S. PATENT DOCUMENTS

| 5,212,369 | A | | 5/1993 | Karlisch et al. | |
|---|---|---|---|---|---|
| 5,588,146 | A | | 12/1996 | Leroux | |
| 5,855,483 | A | * | 1/1999 | Collins et al. | 434/322 |
| 5,933,816 | A | * | 8/1999 | Zeanah et al. | 705/35 |
| 5,935,249 | A | * | 8/1999 | Stern et al. | 713/201 |
| 5,953,504 | A | * | 9/1999 | Sokal et al. | 709/227 |
| 5,960,200 | A | * | 9/1999 | Eager et al. | 717/5 |
| 5,983,003 | A | * | 11/1999 | Lection et al. | 709/202 |
| 5,983,200 | A | * | 11/1999 | Slotznick | 705/26 |
| 6,005,942 | A | * | 12/1999 | Chan et al. | 713/187 |
| 6,014,748 | A | * | 1/2000 | Tushie et al. | 713/200 |
| 6,055,637 | A | * | 4/2000 | Hudson et al. | 709/225 |
| 6,076,166 | A | * | 6/2000 | Moshfeghi et al. | 713/201 |
| 6,175,922 | B1 | * | 1/2001 | Wang | 713/182 |
| 6,223,984 | B1 | * | 5/2001 | Renner et al. | 235/380 |
| 6,282,522 | B1 | * | 8/2001 | Davis et al. | 235/375 |

OTHER PUBLICATIONS

Guthery, S.B., "Java card: Internet computing on a smart card", IEEE Internet Computing, vol. 1 Issue 1, pp. 57–59, Jan. 1997.*
Matsuo, N.; "Personal Telephone Services Using IC–Cards"; IEEE Communications Magazine, Jul. 1989.*
PCMCIA association; "PC Card Standard, Release 2.0"; Sep. 1991.*
Lim, C. H.; "Smart Card Reader"; IEEE Transactions on Consumer Electronics, vol. 39, No. 1, Feb. 1993.*
"Plug and Play Parallel Port Devices"; Microsoft; Mar., 1996.*
Kramer, D.; "The Java Platform—A White Paper"; Sun Microsystems, May 1996.*

* cited by examiner

Primary Examiner—Mark H. Rinehart
Assistant Examiner—Marc D. Thompson
(74) Attorney, Agent, or Firm—Thomas A. Beck; Louis P. Herrzberg

(57) ABSTRACT

A distributed data processing system such as a retail store customer transaction network using smart cards provides an object oriented processing environment at each transaction terminal to enable smart cards of different types to be handled by loading card handling objects appropriate to cards presented and the reader to which they are presented.

2 Claims, 4 Drawing Sheets

DATA PROCESSING SYSTEM USING ACTIVE TOKENS AND METHOD FOR CONTROLLING SUCH A SYSTEM

FIELD OF THE INVENTION

This invention relates generally to data processing systems and more particularly to such systems in which transactions are initiated and processed using active tokens such as smart cards.

BACKGROUND OF THE INVENTION

Access to facilities such as customer transaction systems is currently obtained by the use of tokens such as keys and plastic cards carrying data in the form of perforated holes or magnetic stripes. Such tokens are effective within limits. Thus while being effective in restricting access to a user authorised by the token, difficulties arise when information on the card requires updating, as is increasingly required in a retail store environment, for example where a loyalty points scheme is being operated.

Active tokens, incorporating data processing and storage facilities, have been developed to address these difficulties. An example of such a token, referred to as a smart card, consists of a plastic card of generally similar dimensions to those of a conventional credit card which incorporates an integrated circuit chip with data processing and storage capability.

Smart cards have been used in various applications including retailing, automatic teller machines (ATM's) and the control of access to pay TV facilities. As the use of such cards increases so does the variety of cards and associated card readers.

Moreover customer transaction processing systems are increasingly of the distributed type in which a number of processing stations are interfaced over communication links to one or more application providers or servers. In such a system the components are frequently provided by different suppliers using different styles and makes of tokens and token readers. This raises considerable difficulties in the application of the smart card technology to such systems.

SUMMARY OF THE INVENTION

According to the invention there is provided a data processing system comprising one or more processing stations access to each of which may be obtained through a token reader, in which each processing station is adapted to provide an object orientated execution platform having access to a library of application objects and is further adapted, on presentation of a token to a given reader, to identify the type of token presented, to select an application object from said library appropriate to such token, and to run the selected object on said platform.

According to a second aspect of the invention there is provided a method of controlling a data processing system of the type having one or more processing stations access to each of which may be obtained through a token reader, comprising the steps of providing the or each processing station with an object orientated execution platform having access to a library of application objects, identifying the type of token presented to a given reader, selecting an application object from said library appropriate to such token, and running the selected object on said platform.

Certain types of active token may provide facilities for performing object orientated procedures themselves and in order to take advantage of such facilities the processing station may be further adapted to establish at least part of the execution platform on the token.

The application objects are preferably constructed using an interpretative object orientated (OO) language such as Java (trademark of Sun Microsystems, Inc.)

In a preferred embodiment of the invention presentation of a token causes the processing station to run a generic application written in the Java language to identify the type of reader and the type of smart card presented thereto. This initiates a particular object, also written in Java, which handles the input and output for the processing station to which the token has been presented. The automatic selection of type-specific token handler objects avoids a requirement for customisation of applications to work with different types of tokens and token readers.

In a distributed transaction processing environment the presentation of a card at a particular transaction processing terminal may, if an object appropriate thereto is not found in the local library, cause searches to be made in remote libraries and if successful the appropriate object to be transmitted over the links connecting the components of the system to the requesting terminal. Thus if a card is presented with which the local terminal is unfamiliar, a transaction may still be successfully processed by involving a server with which that particular type of card is more commonly used.

BRIEF DESCRIPTION OF THE DRAWINGS

In order that the invention may be well understood a preferred embodiment thereof will now be described with reference to the accompanying drawings, in which.

DETAILED DESCRIPTION OF THE PREFERRED EMBODIMENT

Figure 1:
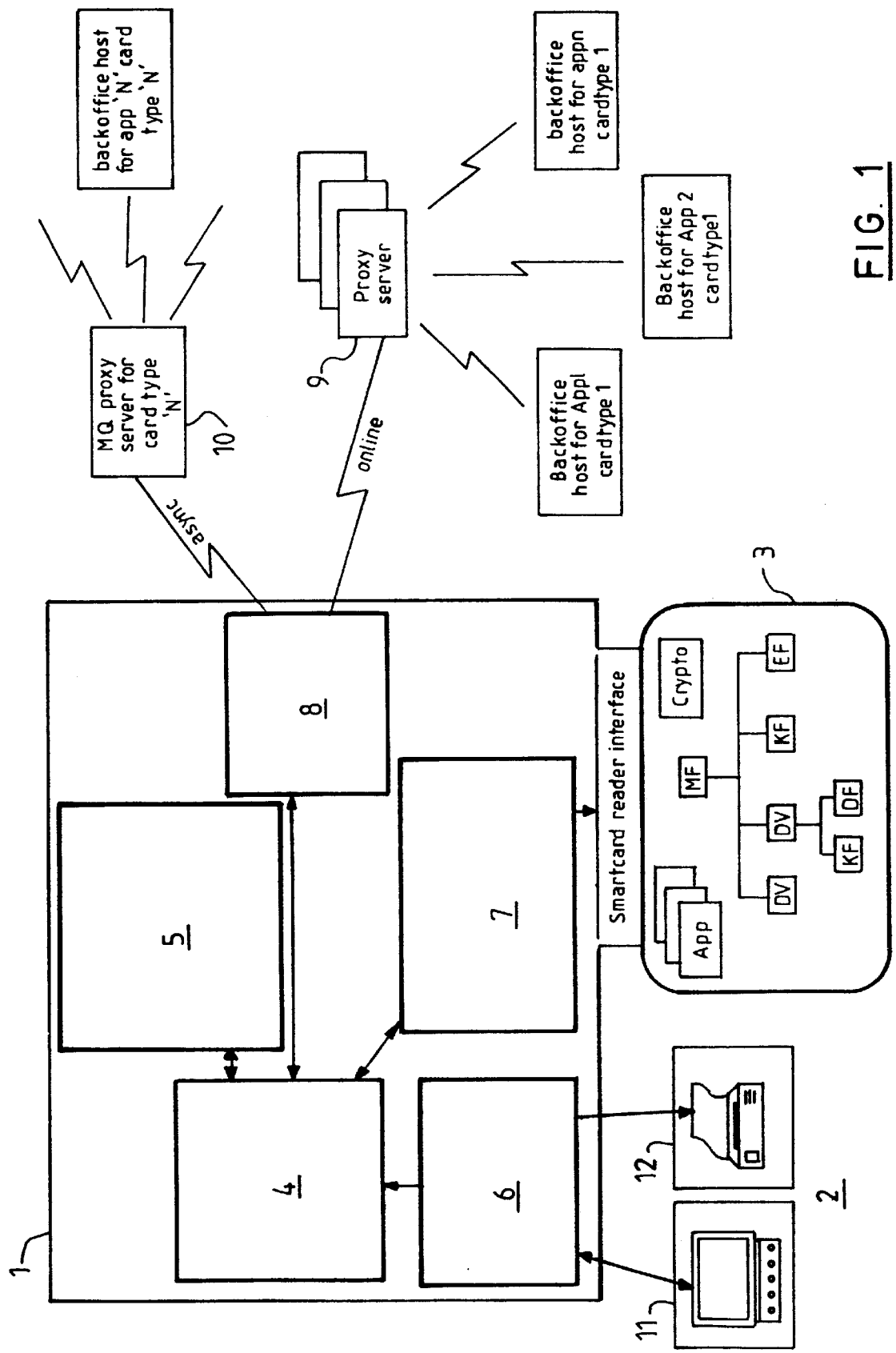
FIG. 1 is a block diagram of a distributed data processing system embodying the invention.

Referring to FIG. 1. there is shown a distributed data processing system embodying the invention, in simplified block form. The system constitutes a network linking one or more servers to a number of terminals each performing particular services for the network operator. Shown at 1 is a terminal in the network for handling customer transactions in a retail environment enabling each transaction to be initiated by the insertion of a smart card 3 which is read and written via an interface 4 to provide and receive data relating to the transaction, which data is displayed and printed by input/output equipment 2.

Each transaction is controlled by a generic application processor 4 which in accordance with the present invention provides an object oriented platform in which the various application objects associated with the transaction can be instantiated. This is accomplished in the present embodiment by establishing a Java language interpreter in the terminal 1. Depending on the capability of the smart card presented to the terminal 1 to accept and run the appropriate interpreter, the terminal may cause some of the objects connected with a transaction to be performed on the card itself. In this way the card provides at least part of the object oriented platform at the terminal. This facility permits, for example, procedures which may be unique to a particular class of card to be performed on the card rather than in the terminal.

An application library 5 stores a number of objects relating to the transactions most likely to be performed by the terminal 1, in this case objects relating to retail transactions. A user interface library 6 also connected to the processor 4 stores objects required to establish the proper interface between the input/output equipment 2 and the types of smart card 3 likely to be presented to the terminal.

As will be described below the system of the invention permits various types of smart cards to be handled by performing an initial card validation process which results in the allocation of the appropriate interface object for the card presented. Once the card has been validated and the appropriate object allocated transfer of data between card 3 and terminal 1 proceeds under the control of an agent object selected from a number of objects stored in a card type object library 7.

A server interface 8 provides communication with other components of the network which in a typical retail environment may include one or more proxy servers 9 connected on line and one or more message queuing (MQ) proxy servers 10 connected over an asynchronous link. The servers 9 and 10 will typically handle a number of applications through linked host machines which themselves perform applications using smart cards or other cards not necessarily of the type used by customers in connection with their transactions at terminal 1.

Figure 2:
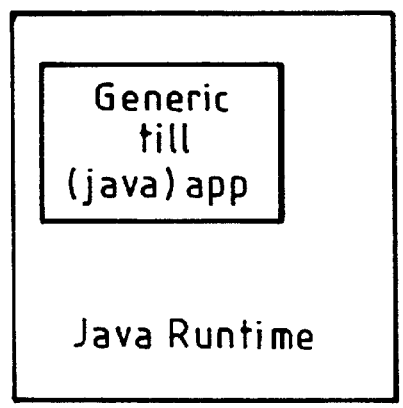
FIGS. 2–6 show various components of the system of FIG. 1.

FIG. 2. shows the processor module 4 in greater detail. In the example shown terminal 1 is a till which may be used by one or more store employees to conduct customer transactions. The module contains the main or generic application responsible for identifying the type of smart card in the reader and invoking the correct application object to process the data on, or for, that particular smart card. This generic application is written in the Java language and constitutes the main routine associated with the particular terminal in question, all other routines being normally dynamically loaded Java objects obtained from the various library modules in the terminal or, if required, as a result of searches performed elsewhere in the network. The latter situation could arise for example where a card is presented of a type not normally handled by the terminal but which is commonly used in an application elsewhere in the network. Terminal 1. then initiates a request for the appropriate object to be made accessible through server 9 or 10.

As described earlier, terminal 1 stores the Java language interpreter which takes the selected object or objects for conversion into run time code to control the performance of the appropriate input/output operation.

Figure 3:
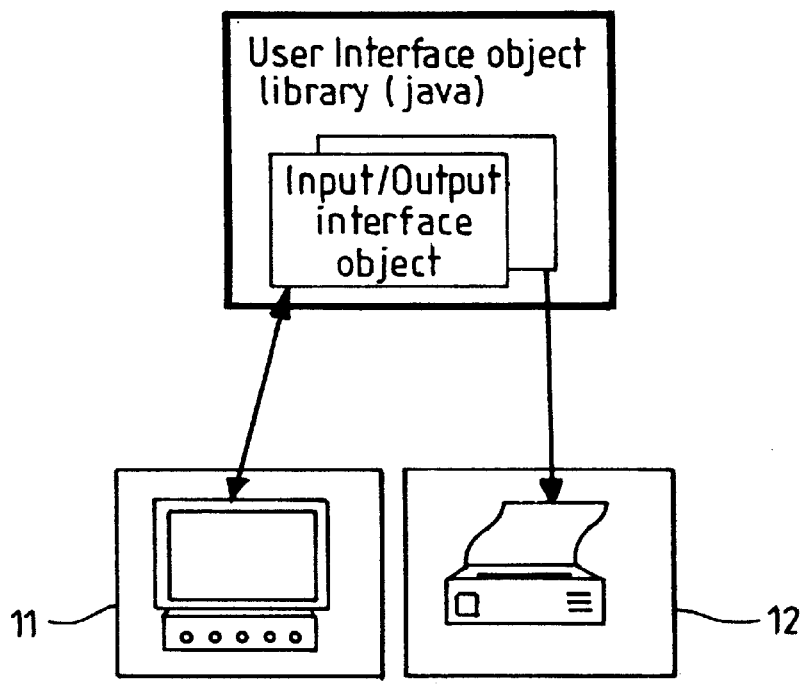

FIG. 3. shows the user interface module 6 in greater detail. This module incorporates a set of objects that are particular to the card reader which is responsible for handling the input and output for the terminal. These objects define standard interfaces and are accordingly not interpreted, being implemented as Java native methods for execution in machine code. In the particular example shown terminal 1 has associated with it a display 11 and a printer 12 which are controlled using standard interface objects.

Figure 4:
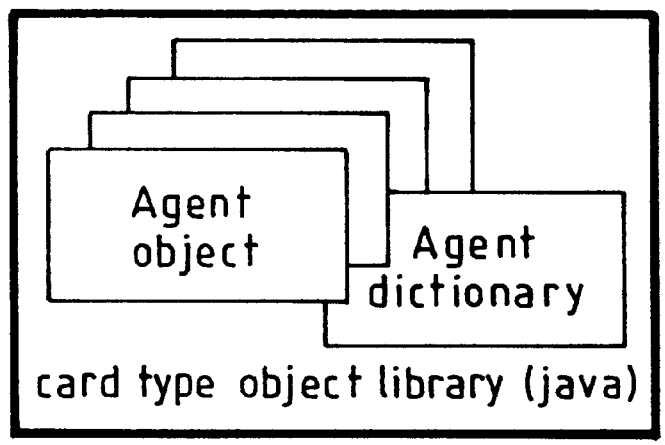

The card type object library 7 is shown in greater detail in FIG. 4. This module contains a common object interface that performs the required protocol mapping for each of a number of card types which may be presented to the reader. It also contains the necessary interface objects to permit data to be exchanged with the different types of card. Thus an agent dictionary is provided which is used to search and select one of a number of agent objects to control a given card initiated transaction. As discussed earlier if a card is presented which is not found in the dictionary a search may be made elsewhere in the network to cause an appropriate object to be loaded so that the transaction may proceed.

The following list of Java objects or classes provides an example of the library contents used to interface to a smartcard I/O device for accepting consumer transaction (CT) cards CTCard The base class for smartcard access Control Performs a control command/operation on the smartcard I/O device and/or card (if present).

Status

Returns the current status of the I/O device and card (if present). Once the Open has been issued more detailed information about the card can be extracted.

Open

Used to open and bind to the current card. Once the card is opened successfully the following methods become accessible;

Close

Used to close and unbind the current card, also causes the current card to be ejected from the reader.

Erase

Used to remove a file from a smartcard and ensure that the cata area is cleared.

Display

Used to output information to the display (if present).

Exec

Used to execute a procedure on the smartcard. If the card does not support this function the procedure will be executed in the reader environment.

Input

Used to get input from the keypad (if present).

Log

Used to add information to an event log.

Print

Used to output information to the printer (if present).

File

Will attempt to open an existing file, or create a new file on the card.

Figure 5:
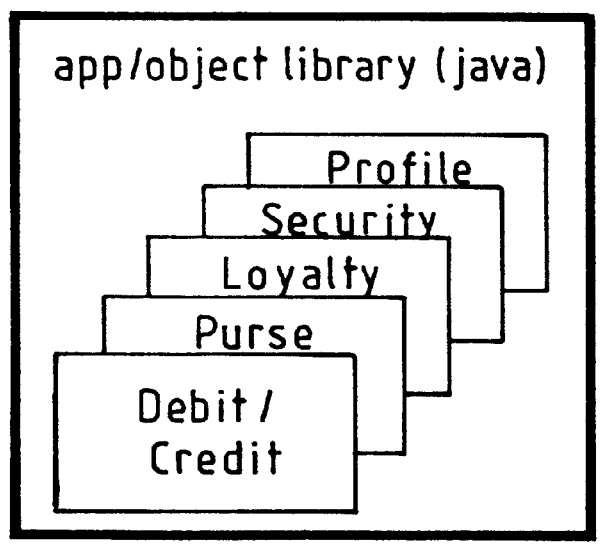

Typically the card used in a given transaction will be a multi-function card, capable of controlling the performance of a number of customer transactions. The application object library module 5 shown in greater detail in FIG. 5 contains a set of specific application objects and base function objects for performing the required application. As shown in FIG. 5 a number of applications are provided for including the use of the card as a standard debit/credit card, as a "purse" to defining a given amount which may be used for certain transactions, or as a loyalty card to accumulate loyalty points for subsequent redemption. Provision is also made for basic security operations such as the use of a PIN number and the storage and updating of customer profile data.

Figure 6:
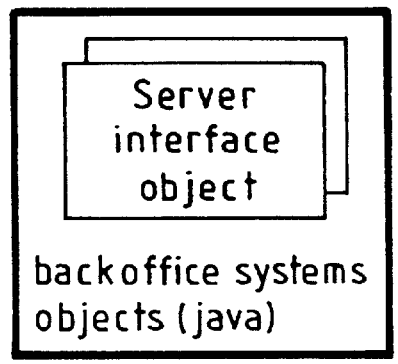

The result of any transaction will normally result in data which needs to be collected from and/or sent to a server. FIG. 6. shows in greater detail the server interface module 8 which contains a set of server interface objects which provide the mechanism for the application objects to exchange data with the remainder of the network. Only the required network interface objects are loaded into this library. Typically these are Java methods but, if it is required to communicate directly with communications hardware, they may be Java native methods.

Thus there is no restriction as to where the various (non-hardware related) Java objects reside, the level of distributed processing being governed by the generic application in module 4 and the application objects stored in the various libraries in the terminal 1. This enables the various objects used in a given terminal to be local, remote or dynamically downloaded from the server as required. As already discussed this permits a wide range of smart cards to be handled and, for certain applications, permits the terminal to be reconfigured, for example by porting a specific Java language interpreter to the Terminal 1, to handle particular situations.

Normally, smart card applications will execute either totally within the terminal 1 or perhaps in an intelligent card reader attached to the terminal. However in a retail application, where the application model may reside in an in-store server, a further level of distribution will occur.

Figure 7:
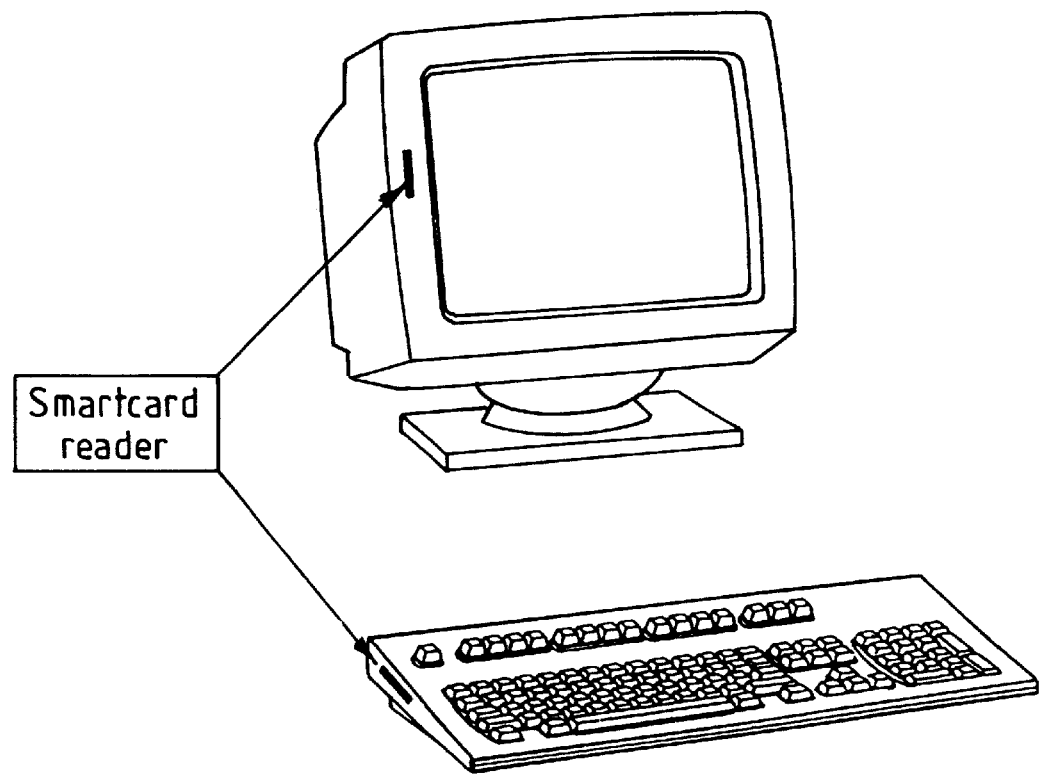
FIG. 7 shows the location of smart card readers in the preferred system.

Whilst in the example shown a separate card reader is used in association with the terminal 1 it will be appreciated that the reader may conveniently be located in a keyboard or display unit associated with the terminal, as shown in FIG. 7. In certain applications, for example in customer kiosks where touch screens are employed for both display and input, the touch screen display would be provided with a card reader.

It will further be appreciated that although the use of an interpretive language such as Java provides a particularly convenient implementation of the invention, other object oriented languages, such as C++ could be employed. In this case the necessary platform is provided by arranging for a C++ compiler to be available at each transaction processing terminal.

What is claimed is:

1. A data processing system comprising a network linking one or more servers to one or more terminal processing stations, access to each of which may be obtained through a token reader smart card which is read and written via an interface to provide and receive data relating to a desired transaction, with data resulting therefrom;

each said transaction is controlled by an application processing station which provides an object oriented execution platform having access to a library of application objects and is adapted, on presentation of a token reader smart card to a given reader to run a generic application by means of a generic application processor module, to identify the type of said reader and the type of said token presented thereto, and to select an application object from said library appropriate to such token, and to run said selected object on said platform;

said application objects being constructed from an interpretative object orientated language;

said token reader smart card having a given capability and depending upon said capability of said token reader smart card as presented to said terminal, to accept and to run an appropriate interpreter, said terminal providing at least part of said object oriented platform on said token reader smart card itself and causes some objects connected with a transaction to be performed on said token reader smart card rather than on said terminal;

said terminal further comprising a library which stores objects relating to transactions most likely to be performed by said terminal and a user interface library which is connected to said processor which stores objects required to establish an effective interface between input/output equipment and said token reader smart card to be presented to said terminal; and a server interface providing communication with other components of said network including proxy servers connected on line and one of more message queuing proxy servers connected over an asynchronous link.

2. A method of controlling a data processing system of the type having a network linking one or more servers to one or more terminal processing stations, access to each of which may be obtained through a token reader smart card which is read and written via an interface to provide and receive data relating to a desired transaction, with data resulting therefrom, comprising the steps of:

providing each said processing station with an object oriented execution platform having access to a library of application objects, identifying the type of token presented to a given reader to run a generic application, to identify the type of said reader and the type of said token presented thereto, selecting an application object from said library appropriate to such token, and running said selected object on said platform; said application objects being constructed from an interpretative object oriented language;

said token reader smart card, having a given capability and depending upon said capability of said token reader smart card, is presented to said terminal to accept and run an appropriate interpreter, whereby said terminal causes some of the objects connected to a transaction to be performed on said token reader smartcard itself rather than on said terminal;

using a library within said terminal, which library which stores objects relating to transactions most likely to be performed by said terminal and using a user interface library connected to said processor to store objects required to establish an effective interface between input/output equipment and said token reader smart card to be presented to said terminal; and providing communication via a server interface with other components of said network including proxy servers connected on line and one of more message queuing proxy servers.

* * * * *